US011777150B2

(12) United States Patent
Ellis et al.

(10) Patent No.: US 11,777,150 B2
(45) Date of Patent: Oct. 3, 2023

(54) BATTERY MODULE

(71) Applicant: SparkCharge, Inc., Somerville, MA (US)

(72) Inventors: Christopher R. Ellis, Melrose, MA (US); Richard Whitney, Somerville, MA (US)

(73) Assignee: SPARKCHARGE, INC., Somerville, MA (US)

( * ) Notice: Subject to any disclaimer, the term of this patent is extended or adjusted under 35 U.S.C. 154(b) by 205 days.

(21) Appl. No.: 17/006,391

(22) Filed: Aug. 28, 2020

(65) Prior Publication Data

US 2021/0066760 A1 Mar. 4, 2021

Related U.S. Application Data

(60) Provisional application No. 62/892,804, filed on Aug. 28, 2019.

(51) Int. Cl.
*H01M 10/42* (2006.01)
*H01M 10/48* (2006.01)
*H01M 50/572* (2021.01)

(52) U.S. Cl.
CPC ..... *H01M 10/425* (2013.01); *H01M 10/4207* (2013.01); *H01M 10/482* (2013.01); *H01M 50/572* (2021.01); *H01M 2010/4271* (2013.01)

(58) Field of Classification Search
CPC .......... H01M 10/425; H01M 10/4207; H01M 10/482; H01M 50/572
See application file for complete search history.

(56) References Cited

U.S. PATENT DOCUMENTS 7,053,588 B2 5/2006 Nakanishi et al.
7,990,109 B2 8/2011 White et al.
(Continued)

FOREIGN PATENT DOCUMENTS

DE 102014200640 7/2015
EP 2063279 4/2013

OTHER PUBLICATIONS

International Search Report and Written Opinion of the International Searching Authority for PCT/US2020/048549, dated Jan. 21, 2021, 14 pages.

(Continued)

*Primary Examiner* — Karie O'neill Apicella
(74) *Attorney, Agent, or Firm* — Victor A. Cardona; Stephen P. Scuderi; Heslin Rothenberg Farley & Mesiti PC (57) ABSTRACT

A battery module includes a set of power contacts, a set of signal contacts and a battery pack operable to deliver electrical power to the set of power contacts. An electronic isolation system is operable to electrically disconnect and connect the battery pack and the set of power contacts. An electronic control system is electrically connected to the electronic isolation system and to one of the set of signal contacts or the set of power contacts. The electronic control system is operable to measure a parameter associated with one of the battery module and an electrical device and to compare the parameter to a predefined value. The electronic isolation system connects the battery pack to the set of power contacts based on a positive result of the comparison, and disconnects the battery pack and the set of power contacts based on a negative result of the comparison.

9 Claims, 4 Drawing Sheets

(56) References Cited

U.S. PATENT DOCUMENTS

| | | | |
|---|---|---|---|
| 8,373,392 B2 * | 2/2013 | Dai | H02H 7/18 |
| | | | 361/88 |
| 8,963,481 B2 | 2/2015 | Prosser et al. | |
| 9,276,421 B2 | 3/2016 | Weissinger, Jr. et al. | |
| 9,373,973 B2 | 6/2016 | Lee | |
| 9,484,604 B2 | 11/2016 | Schaffner et al. | |
| 9,789,782 B2 | 10/2017 | Holgers et al. | |
| 10,326,288 B2 | 6/2019 | Steil | |
| 2009/0295398 A1 * | 12/2009 | Ohnuki | H01M 50/569 |
| | | | 324/429 |
| 2011/0260755 A1 | 10/2011 | Littow | |
| 2012/0256598 A1 | 10/2012 | Hsu et al. | |
| 2016/0156206 A1 * | 6/2016 | Yamaji | H02H 3/044 |
| | | | 320/112 |
| 2018/0233785 A1 | 8/2018 | Na et al. | |
| 2019/0319466 A1 | 10/2019 | Pk | |
| 2020/0089183 A1 | 3/2020 | Kallikuppa et al. | |

OTHER PUBLICATIONS

Stephens, Lithium-ion Battery Safety Issues for Electric and Plug-in Hybrid Vehicles, National Highway Traffic Safety Administration, Oct. 2017, pp. 1-261, US Department of Transportation.

\* cited by examiner

BATTERY MODULE

CROSS REFERENCE TO RELATED APPLICATIONS

This Patent Application claims priority to U.S. Provisional Patent Application No. 62/892,804, filed Aug. 28, 2019, and entitled Battery Interlock Detection System. The entire contents of the aforementioned application is hereby incorporated herein by reference.

TECHNICAL FIELD

The present disclosure relates to battery modules. More specifically, the disclosure relates to battery modules having electronic isolation and power flow control systems.

BACKGROUND

A battery module system is a set of any number of battery modules, wherein each battery module includes a battery pack. Each battery pack includes one or more battery cells. The battery modules of the battery module system may be electrically configured in series, parallel or a mixture of both to deliver the desired voltage, capacity, or power density required for any number of applications. Battery module systems are used in energy dense battery applications such as charging an electric vehicle ("EV"), powering heavy duty power tools, or the like.

The risk of assembling the battery modules of a battery module system may be low as long as the battery packs are equally matched. Battery packs may be precisely measured, calibrated and matched at the initial manufacturer for such parameters as internal resistance, initial voltage and state of charge (SOC). The battery modules may then be discharged at the factory down to a SOC that is legal for shipping (for example, between 30% to 60% of full charge) and shipped to their final destination, where the battery modules can be assembled into the desired battery module systems.

Problematically however, battery modules may have their SOC, internal resistance and other internal parameters inadvertently changed during shipment. For example, conductive materials may come into contact with the power contacts of the battery modules during shipment. Additionally, the battery modules may have their internal parameters altered at different rates or to different degrees during use. If the difference in internal parameters between two battery modules are unacceptably high, the risk of arcing, fire or other hazards grow significantly.

Further, if two battery modules are at a significantly different SOC, the battery module with the greater SOC will discharge into the battery module with the lesser SOC, and the total power output will drop significantly. Moreover, significantly different SOCs between battery modules may cause back flow currents, which can damage a battery module.

Accordingly, there is a need for a battery module that can prevent or inhibit making electrical contact with other battery modules (or other similar electrical devices) if their internal parameters are significantly different. Further, there is a need for a battery module that can prevent or inhibit back flow. Additionally, there is a need for a battery module system wherein the individual battery modules of the battery module system may selectively connect with each other depending on the differences in internal parameters of each battery module.

BRIEF DESCRIPTION

The present disclosure offers advantages and alternatives over the prior art by providing a battery module with an electronic isolation system and a power flow control system electrically connected between the battery pack and the power contacts of the battery module. The electronic isolation system prevents the battery pack from connecting to the power contacts if one or more parameters from either the battery module or a second electrical device that is to be connected to the battery module are at an unacceptable value. For example, the electronic isolation system may prevent electrical contact between the battery pack and power connectors of a first battery module that is to be connected to a second battery module, if the SOCs of the first and second battery modules are outside of an acceptable range of value. Further, the battery modules may be assembled into a battery module system wherein each of the battery modules may selectively connect to the other battery modules depending on differences in their internal parameters.

Additionally, the power flow control system prevents or inhibits current back flow from the power connectors to the battery pack of a battery module no matter what the battery module is connected to. For example, the power flow control module may include one or more diodes or other unidirectional current devices and systems to prevent or inhibit such back flow.

A battery module in accordance with one or more aspects of the present disclosure includes a first set of power contacts, a first set of signal contacts and a battery pack operable to deliver electrical power to the set of power contacts. An electronic isolation system is operable to electrically disconnect and electrically connect the battery pack and the first set of power contacts. An electronic control system is electrically connected to the electronic isolation system and to the first set of signal contacts and/or the first set of power contacts. The electronic control system is operable to measure a parameter associated with the battery module and/or an electrical device and to compare the parameter to a predefined value to determine if it is desirable to connect the battery module to the electrical device. The electronic isolation system connects the battery pack to the first set of power contacts based on a positive result of the comparison. The electronic isolation system disconnects the battery pack and the first set of power contacts based on a negative result of the comparison.

Another battery module in accordance with one or more aspects of the present disclosure includes a first set of power contacts, a first set of signal contacts and a battery pack operable to deliver electrical power to the set of power contacts. A power flow control system is connected between the battery pack and the first set of power contacts. The power flow control system is operable to inhibit reverse flow of current from the first set of power contacts to the battery pack.

A battery module system in accordance with one or more aspects of the present disclosure includes a battery module system power bus and a plurality of battery modules. A first battery module of the plurality of battery modules includes a first set of power contacts electrically connected to the power bus, a first set of signal contacts and a first battery pack operable to deliver electrical power to the first set of power contacts. A first electronic isolation system is operable to electrically disconnect and connect the first battery pack and the first set of power contacts. A first electronic control system is electrically connected to the first electronic isolation system and to one of the first set of signal contacts and the first set of power contacts. The electronic control system is operable to measure a parameter associated with one of the first battery module and a second battery module of the plurality of battery modules and to compare the parameter to a predefined value to determine if it is desirable to connect the first battery module to the second battery module. The electronic isolation system connects the battery pack to the first set of power contacts based on a positive result of the comparison. The electronic isolation system disconnects the battery pack and the first set of power contacts based on a negative result of the comparison.

DRAWINGS

The disclosure will be more fully understood from the following detailed description taken in conjunction with the accompanying drawings, in which.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example maybe combined with the features of other examples. Such modifications and variations are intended to be included within the scope of the present disclosure.

The terms "significantly", "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
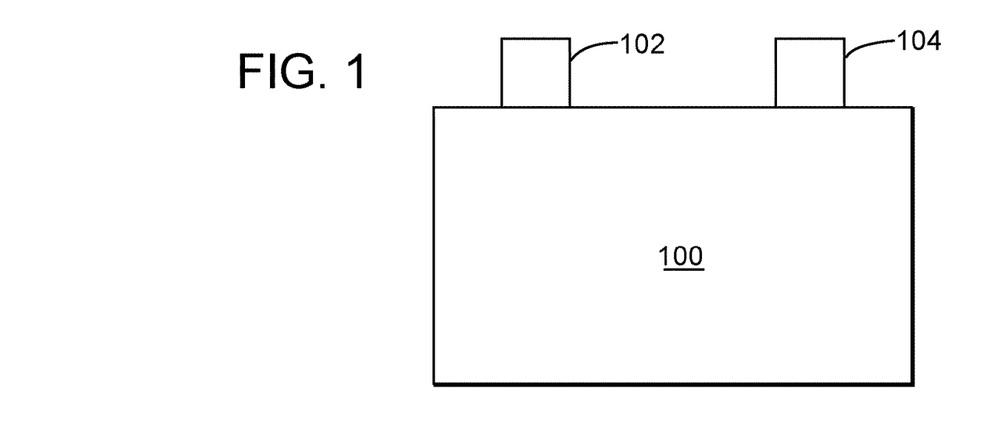
FIG. 1 depicts an example of a schematic of a battery module and its outside interfaces, according to aspects described herein.

Referring to FIG. 1, an example is depicted of a schematic of a first battery module 100 and its outside interfaces, according to aspects described herein. The outside interfaces include one or more sets of power contacts 102 and one or more sets of signal contacts 104. Each set of power contacts 102 may have one or more contacts that are operable to conduct power generated from a battery pack 106 (see FIG. 2) to the battery module 100. Each set of signal contacts 104 may have one or more contacts that are operable to communicate with, send and/or receive signals.

As an overview, battery modules, such as battery module 100, may be electrically isolated from the outside world during transportation and storage to prevent the risk of electric shock and other safety hazards, such as arcing. As will be described in greater detail herein, the battery module 100 uses hardware and software redundancies before allowing for the energization of the power contacts 102.

This ensures that the power contacts 102 only become energized after being connected to a second electrical device 120 (see FIG. 3) when certain measured parameters of either the battery module 100 or the second electrical device 120 have an acceptable value. The second electrical device may be, for example, an energy transfer module, a specific battery module charger, a specific predetermined load, and/or additional battery modules. The battery module 100 may be used in energy dense battery module systems 200 (see FIG. 5) used, by way of example, for a portable electric vehicle 206 (see FIG. 5) charging. In addition, the battery module 100 contains electrical hardware that ensures multiple battery modules connected do not discharge into each other. The power flow control system 108 of battery module 100 ensures substantially insignificant reverse currents no matter what voltage the battery module 100 and a second electrical device 120 are at. This improves the efficiency and reliability of the battery module 100.

Figure 2:
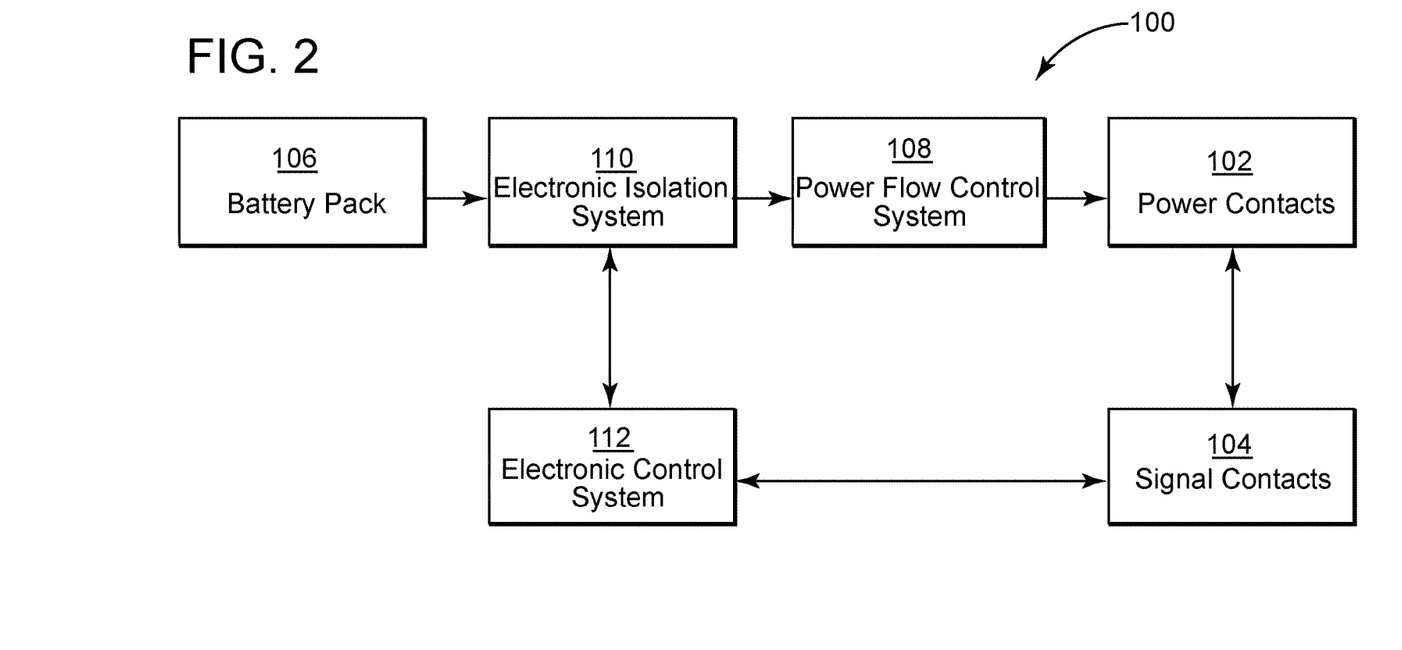
FIG. 2 depicts an example of a schematic of the high power and communication systems of the battery module of FIG. 1, according to aspects described herein.

Referring to FIG. 2, an example is depicted of a schematic of power and communication systems of the battery module 100, according to aspects described herein. As mentioned earlier, the battery module 100 includes, one or more sets of power contacts 102 and signal contacts 104 as outside interfaces. Additionally, inside the battery module 100 is battery pack 106, power flow control system 108, an electronic isolation system 110, and an electronic control system 112 for both the battery module 100 and the other electrical devices, such as the second electrical device 120 depicted in FIG. 3.

The power contacts 102 provide the ability to charge or discharge the battery module 100. The signal contacts 104 transfer auxiliary voltages, control signals, and serial communication lines between battery modules 100 and other electrical devices 120. As depicted in FIG. 2, the power flow control system 108 prevents or inhibits a battery module 100 with a lower state of charge (SOC) from being charged by a battery module 100 with a higher SOC. The electronic isolation system 110 is a system that may include active switching elements (see FIG. 4) that ensure that the power connectors 102 are not energized in the absence of a control voltage (not shown) on the electronic isolation system 110. The electronic control system 112 in the battery module 100 handles a multitude of functions. By way of example, the electronic control system 112 may provide auxiliary voltages to devices external to the battery module 100, determine the number of connected battery modules 100 in a battery module system 200 (see FIG. 5), provide serial communication between the battery module 100 and external devices (such as electrical device 120 of FIG. 3), and determine when to safely turn on and off the electronic isolation system 110.

The electronic control system 112 contains several electrical signals and sensors (see FIG. 4) that may be used to control the electronic isolation system 110 and the power flow control system 108. Those signals and sensors include, but are not limited to battery count, top detect, bottom detect, CAN bus, battery enable, and control voltages. The combination of these signals and sensors allow for the battery module 100 and battery module system 200 to ensure that they only energize the power terminals 102 when an appropriate device (such as second electrical device 120 of FIG. 3) is connected and ready to use the energy stored in the battery modules 100 and/or batter module systems 200.

Referring again to FIGS. 1 and 2, the first battery module includes a first set of power contacts 102 and a first set of signal contacts 104 as outside interfaces. A battery pack 106 is operable to deliver electrical power to the set of power contacts 102. The battery pack 106 may be comprised of a system of battery cells (not shown). Each battery cell may include one or more anodes and cathodes separated by an electrolyte.

An electronic isolation system 110 is operable to electrically disconnect and electrically connect the battery pack 106 and the first set of power contacts 102. An electronic control system 112 is electrically connected to the electronic isolation system 110 and to at least one of the first set of signal contacts 104 or the first set of power contacts 102. The electronic control system 112 is operable to measure a parameter associated with the first battery module 100 and/or a second electrical device 120 (see FIG. 3) and to compare the parameter to a predefined value to determine if it is desirable to connect the first battery module 100 to the second electrical device 120. The electronic isolation system 110 may connect the battery pack 106 to the first set of power contacts 102 based on a positive result of the comparison of the parameter to the predetermined value. The electronic isolation system may disconnect the battery pack 106 and the first set of power contacts 102 based on a negative result of the comparison.

The second electrical device 120 can be several different types of devices. For example, it could be another battery module 100. Also, it could be a charging device, or an energy transfer module or a specific predetermined load.

The measured parameter described above may be one of several parameters and/or characteristics of either the first battery module 100 or the second electrical device 120 that are important for functioning. For example, the measured parameter could indicate the presence or absence of a certain characteristic in the first battery module 100 and/or second electrical device 120. Also, by way of example, the parameter could be a resistance, a current, a voltage, State of Charge (SOC) or a state of health (SOH) of either the first battery module 100 or the second electrical device 120.

The parameter associated with the first battery module 100 and/or the second electrical device 120 may also include a first parameter associated with the first battery module 100, and a second parameter associated with the second electrical device 120. Additionally, the comparison of the parameter to a predefined value may further include a comparison of a difference between the first parameter and the second parameter to a predefined acceptable range of the difference. If the difference is within the acceptable range, the electronic isolation system 110 may connect the battery pack 106 to the first set of power contacts 102. If the difference is not within the acceptable range, the electronic isolation system 110 may disconnect the battery pack 106 and the first set of power contacts 102.

In other words, the parameter may also be a differential of two parameters measured in both the first battery module 100 and the second electrical device 120. For example, the parameter may be a difference between a state of health (SOH) or a state of charge (SOC) between the first battery module 100 and the second electrical device 120.

The predetermined value that the parameter is compared to may be a value that is significant for functioning of the first battery module 100 and/or the second electrical device 120. For example, the predetermined value may be an acceptable range for a difference in the SOC between the first battery module 100 and the second electrical device 120 (e.g., the second electrical device 120 may be a second battery module 100). For example, an acceptable range may be that the SOC of the first battery module 100 be within plus or minus 50 percent, plus or minus 30 percent, plus or minus 25 percent, plus or minus 15 percent, plus or minus 10 percent, or plus or minus 5 percent of the SOC of the second electrical device.

The first battery module 100 also includes a power flow control system 108 that is connected between the battery pack 106 and the first set of power contacts 102. In the example illustrated in FIG. 2, the power flow control system 108 is connected between the electronic isolation system 110 and the first set of power contacts 102. The power flow control system 108 is operable to prevent or inhibit reverse flow of current from the first set of power contacts 102 to the battery pack 106. The power flow control system 108 may include at least one diode 140 (see FIG. 4) connected between the battery pack 106 and the first set of power contacts 102.

Figure 3:
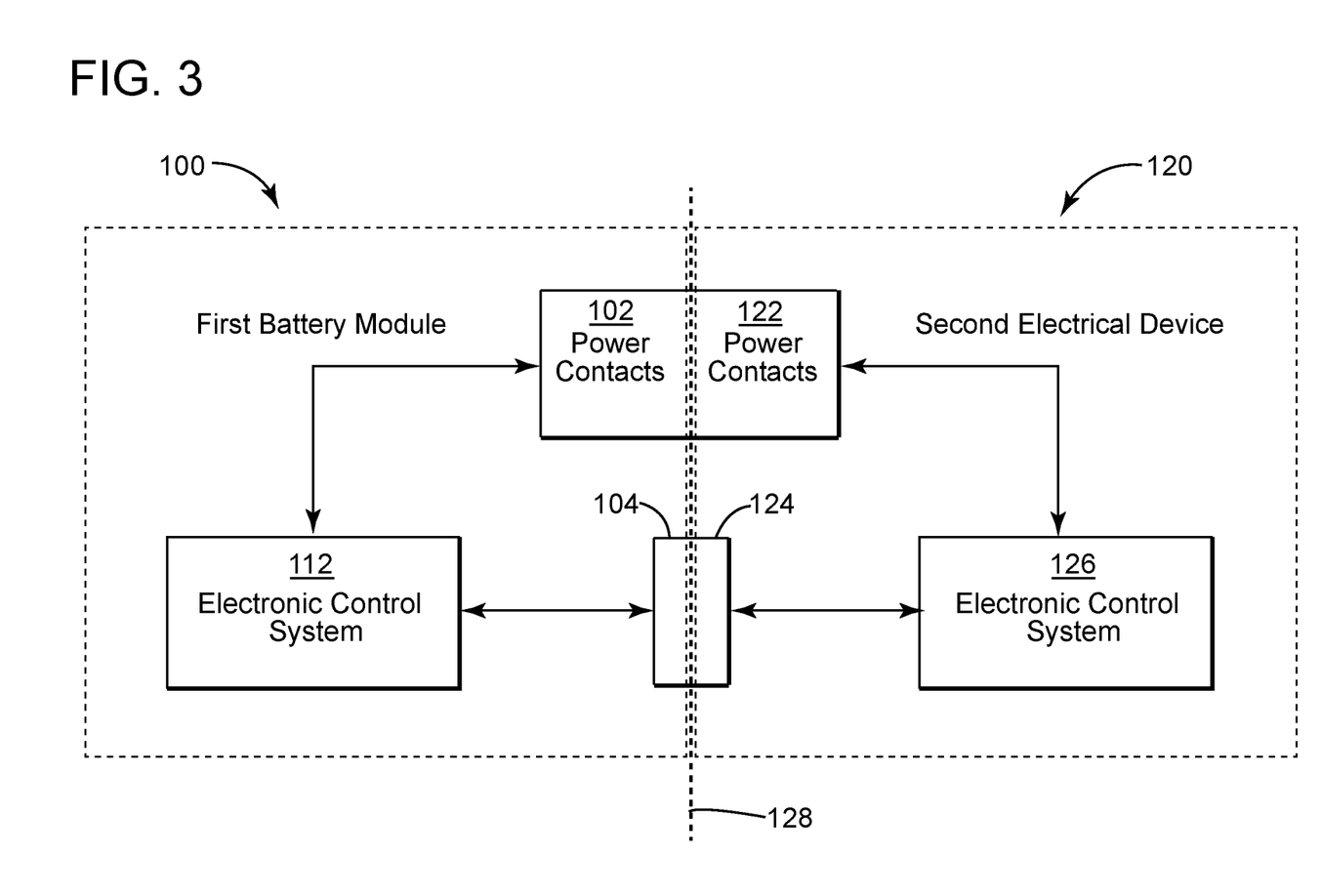
FIG. 3 depicts an example of a schematic of a control interface between a battery module (such as in FIG. 1) and an electrical device, according to aspects described herein.

Referring to FIG. 3, an example is depicted of a schematic of a control interface 128 between the first battery module 100 and a second electrical device 120, according to aspects described herein. The first battery module 100 includes a first set of power contacts 102 that are operable to electrically connect at control interface 128 to a second set of power contacts 122 of the second electrical device 120. Additionally, the first set of signal contacts 104 of the battery module 100 are operable to electrically connect to a second set of signal contacts 124 of the second electrical device 120.

As illustrated in FIG. 3, the electronic control system 112 of the battery module 100 and the electronic control system 126 of the second electrical device 120 are both operable to measure a difference between a first parameter associated with the battery module 100 and a second parameter associated with the second electrical device 120 when the first and second sets of signal contacts 104, 124 are connected together and/or when the first and second sets of power contacts 102, 122 are connected together. The electronic control system 112 of the battery module 100 may measure the parameter through the first set of power contacts 102 and/or through the first set of signal contacts 104. The electronic control system 126 of the second electrical device 120 may measure the parameter through the second set of power contacts 122 and/or through the second set of signal contacts 124.

Figure 4:
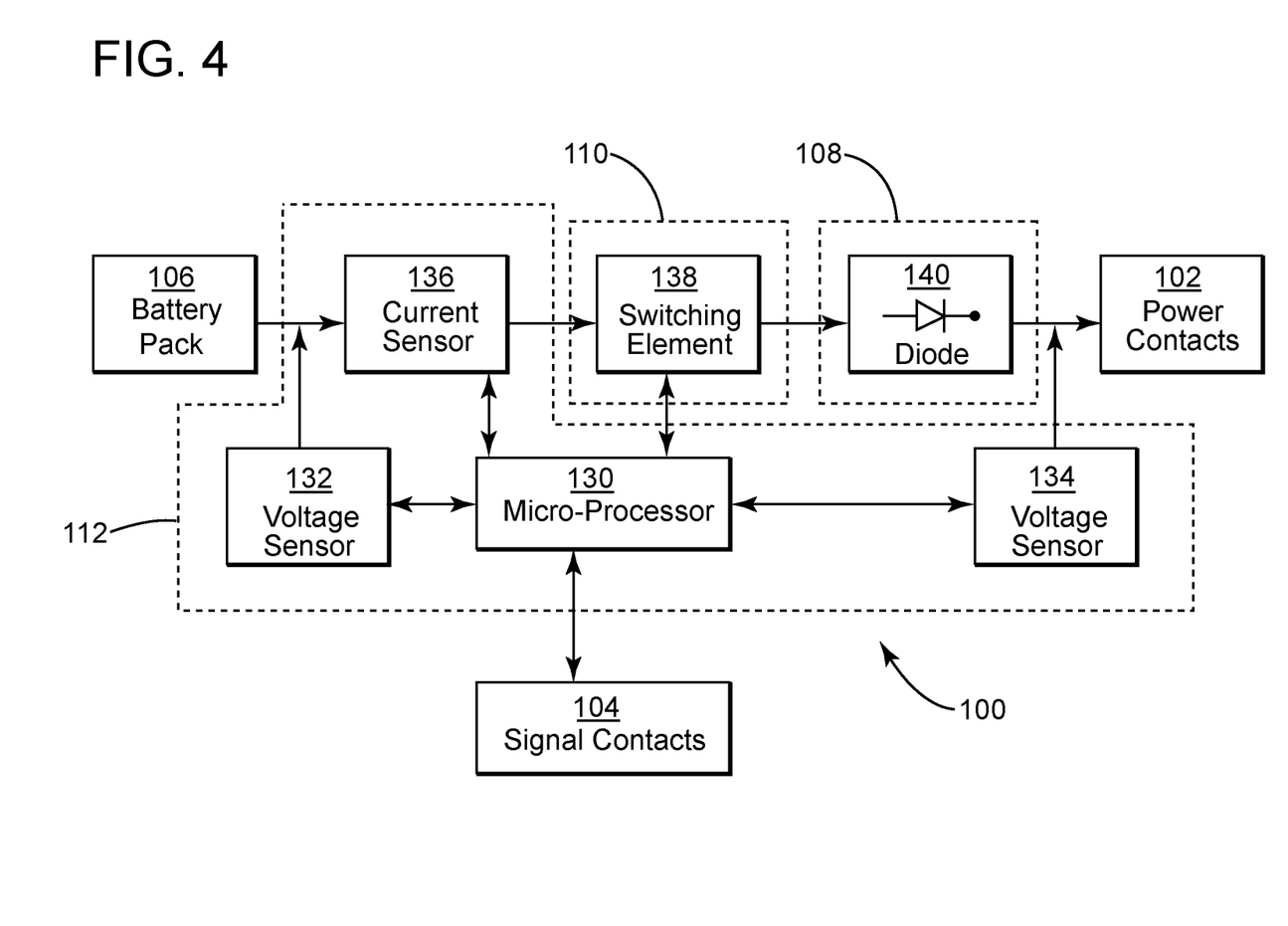
FIG. 4 depicts an example of a schematic of circuitry of the electrical control system, the electrical isolation system and the power flow control system of FIG. 2, according to aspects described herein.

Referring to FIG. 4, an example is depicted of a schematic of circuitry of the electronic control system 112, the electronic isolation system 110 and the power flow control system 208 of the battery module 100, according to aspects described herein. The electronic control system 112 may include a microprocessor 130 having a memory and an executable program in the memory. The microprocessor 130 may be in communication with, receive and/or process signals from the signal contacts 104 and/or the power contacts 102.

The electronic control system 112 may include various voltage sensors 132, 134, in electrical communication with the microprocessor 130, to measure various voltages between the first set of power contacts 102 and the battery pack 106. Further, the electronic control system 112 may include a current sensor 136, in electrical communication with the microprocessor 130, to measure the current being conducted between the battery pack 106 and the first set of power contacts 102.

The electronic isolation system 110 may include at least one switching device 138 electrically connected between the battery pack 106 and the first set of power contacts 102. When the at least one switching device 138 is in an open position, the first set of power contacts 102 are isolated from the battery pack 106. When the at least one switching device 138 is in a closed position, the first set of power contacts 102 are electrically connected to the battery pack 106. The at least one switching device 138 may include one or more relays, MOSFET and/or other types of transistor switches or the like.

The power control system 108 may include one or more diodes 140. Additionally, other unidirectional current elements and/or circuits may be utilized.

Figure 5:
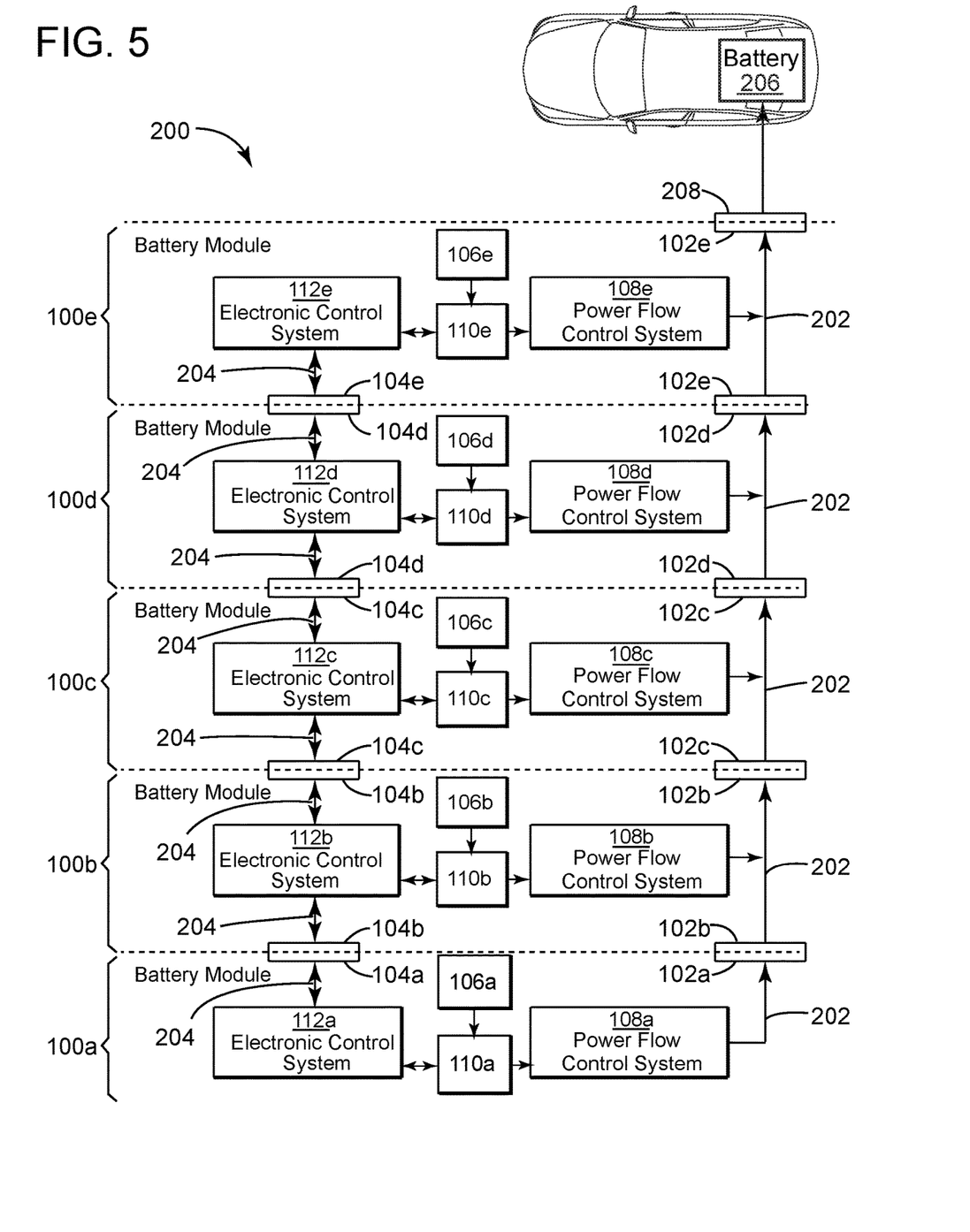
FIG. 5 depicts an example of a schematic of a battery module system having a plurality of battery modules of FIG. 1, according to aspects described herein.

Referring to FIG. 5, an example is depicted of a schematic of a battery module system 200 having a plurality of battery modules 100, according to aspects described herein. The battery module system 200 includes a battery module system power bus 202 that directs the power output from the electrically parallel connected battery modules 100 to an external electric load, such as the battery of electric vehicle 206. By way of example, the power output of the battery module system 200 may be connected to the external electric load through a load connector 208.

In the example illustrated in FIG. 5, an external electric load is a battery for an electric vehicle 206 that the battery module system 200 is charging. However, the external electric load may include any number of electric devices, systems and applications. For example, the external electric load may include power tools, aircraft systems or the like.

The battery module system 200 includes the plurality of battery modules 100*a*-100*e*, which are connected together in parallel at the power bus 202. However, any number of battery modules 100 may be used in the battery module system 200.

The like reference numbers for like components are used in FIG. 5 when referring to any, or all, of the battery modules, and/or the components and systems of the battery modules, in the battery module system 200. However, for purposes of clarity, when referring to a specific battery module, component or system in FIG. 5, the letters "a-e" are appended to the end of the reference number.

A first battery module 100*a* of the plurality of battery modules 100*a*-100*e* includes a first set of power contacts 102*a*, which are electrically connected to the power bus 202. First battery module 100*a* also includes a first set of signal contacts 104*a*, which are electrically connected together through a signal bus 204. Alternatively, the signal contacts may be independently connected to sources of signals such as various sensors. Such independent signals could be passed through a larger cable harness with independent conductors carrying such signals but without a common signal bus.

A first battery pack 106*a* of the first battery module 100*a* is operable to deliver electrical power to the first set of power contacts 102*a*. A first electronic isolation system 110*a* of the first battery module 100*a* is operable to electrically disconnect and connect the first battery pack 102*a* and the first set of power contacts 102*a*. A first electronic control system 112*a* is electrically connected to the first electronic isolation system 110*a* and to one, or both, of the first set of signal contacts 104*a* and the first set of power contacts 102*a*.

The electronic control system 112*a* of first battery module 100*a* may be operable to measure a parameter associated with the first battery module 100*a* and/or a second battery module 100*b* of the plurality of battery modules 100*a*-100*e*. The electronic control system 112*a* may also be operable to compare the parameter to a predefined value to determine if it is desirable to connect the first battery module 100*a* to the second battery module 100*b*. The electronic isolation system 110*a* of battery module 100*a* may then connect the battery pack 106*a* of battery module 100*a* to the first set of power contacts 102*a* of battery module 100*a* based on a positive (e.g., compatible state of charge or compatible voltages before charging) result of the comparison. The electronic isolation system 110*a* may disconnect the battery pack 106*a* and the first set of power contacts 102*a* based on a negative (e.g., non-compatible state of charge) result of the comparison.

Though the first and second battery modules of the battery module system 200 were specifically referenced as battery module 100*a* and battery module 100*b* respectively, the first and second battery modules may each be any battery module 100 of the battery module system 200. In other words, the first battery module 100 may include any battery module 100*a*-100*e* of the plurality of battery modules of battery module system 200. Additionally, the second battery module 100 may include any other battery module 100*a*-100*e* of the plurality of batter modules of battery module system 200.

The parameter measured by electronic control system 112*a* and associated with one, or both, of the first battery module 100*a* and the second battery module 100*b*, may further include: a first state of charge associated with the first battery module 100*a*, and a second state of charge associated with the battery module 100*b*. Additionally, the comparison of the parameter to a predefined value may further include: a comparison of a difference between the first state of charge and the second state of charge to a predefined acceptable range of the difference.

If the difference between the first state of charge (first SOC) and the second state of charge (second SOC) is within the acceptable range, the electronic isolation system 110*a* may connect the battery pack 106 to the first set of power contacts 102*a*. If the difference is not within the acceptable range, the electronic isolation system 110*a* may disconnect the battery pack 106*a* and the first set of power contacts 102*a*. An acceptable range may be that the SOC of the first battery module 100*a* be within plus or minus 50 percent, plus or minus 30 percent, plus or minus 25 percent, plus or minus 15 percent, plus or minus 10 percent, or plus or minus 5 percent of the SOC of the second battery module 100*b*.

The first battery module 100*a* of the battery module system 200 also may include a first power flow control system 108*a* connected between the first battery pack 106*a* and the first set of power contacts 102*a*. The first power flow control system 108*a* is operable to prevent, or inhibit to a substantially insignificant level, reverse flow of current from the first set of power contacts 102*a* to the first battery pack 106*a*. This may be done with one or more diodes 140 (see FIG. 4) of with the use of other unidirectional current elements or circuits.

The second battery module 100*b* may also include a second power flow control system 108*b* connected between the second battery pack 106*b* and the second set of power contacts 102*b*. The second power flow control system 108*b* is operable to prevent or inhibit reverse flow of current from the second set of power contacts 102b to the second battery pack 106b.

The various battery modules 100a-100e of the battery module system 200 may also include a top detection device and a bottom detection device. For example, the first battery module 100a may include a top detection device that is operable to detect another battery module 100 of the plurality of battery modules 100a-100e positioned on a top of the first battery module 100a. Additionally, the first battery module 100a may include a bottom detection device that is operable to detect another battery module 100 of the plurality of battery modules 100a-100e positioned on a bottom of the first battery module 100a.

The top and bottom detection devices may include any number of circuit elements and systems designed to determine if a battery module 100 is in the middle portion of the stack of battery modules 100. The top and bottom detection devices may also aid in determining how many battery modules 100 are above or below any given battery module 100. In an example, a CAN bus contact may be enabled on a bottom side of a bottommost battery module (e.g., battery module 100a) in a stack of battery modules to allow the contact to connect to such a CAN bus. In the remainder, i.e., non-bottommost battery modules, such a CAN bus contact would not be enabled since the CAN bus would only be connected to the bottommost module and a CAN bus contact on a middle or top module in a stack would not be useful. Thus, a location detection device (e.g., a top or bottom detection device) may be useful when only one or more of a stack of battery modules connect to another device, or otherwise function differently that a rest of the stack of battery modules. Another example of a use for the top and bottom detectors is that they may be able to determine if the power bus may be safely isolated from a user/operator. On the bottommost batter a base or cover may be included to ensure the power bus remains fully isolated.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A battery module, comprising:
   a first set of power contacts;
   a first set of signal contacts;
   a battery pack operable to deliver electrical power to the set of power contacts;
   an electronic isolation system operable to electrically disconnect and electrically connect the battery pack and the first set of power contacts; and
   an electronic control system electrically connected to the electronic isolation system and to at least one of the first set of signal contacts or the first set of power contacts, the electronic control system being operable to measure a first parameter associated with the battery module and a second parameter associated with an electrical device that is connected to the first set of power contacts and to compare a difference between the first parameter and the second parameter to a predefined acceptable range of difference to determine if it is desirable to electrically connect the battery pack to the electrical device prior to electrically connecting the battery pack to the first set of power contacts;
   wherein the electronic isolation system only electrically connects the battery pack to the first set of power contacts when the difference between the first parameter and the second parameter is within the acceptable range of difference.

2. The battery module of claim 1, comprising:
   a power flow control system connected between the battery pack and the first set of power contacts, the power flow control system operable to inhibit reverse flow of current from the first set of power contacts to the battery pack.

3. The battery module of claim 1, wherein the electronic isolation system comprises at least one switching device electrically connected between the battery pack and the first set of power contacts such that:
   when the at least one switching device is in an open position, the first set of power contacts are isolated from the battery pack, and
   when the at least one switching device is in a closed position, the first set of power contacts are electrically connected to the battery pack.

4. The battery module of claim 1, comprising:
   the first set of power contacts being operable to electrically connect to a second set of power contacts of the electrical device;
   the first set of signal contacts being operable to electrically connect to a second set of signal contacts of the electrical device;
   the battery pack comprising at least an anode and a cathode that are operable to deliver electrical power to the set of power contacts;
   the electronic control system being operable to measure the difference between the first parameter and the second parameter when the first and second sets of signal contacts are connected together.

5. The battery module of claim 4, wherein the electrical device is a second battery module.

6. The battery module of claim 5, wherein:
   the first parameter comprises a first state of charge of the battery module;
   the second parameter comprises a second state of charge of the second battery module; and
   the difference comprises the difference between a first state of charge and the second state of charge.

7. The battery module of claim 6, wherein the acceptable range of the difference is when the first state of charge is within plus or minus 25 percent of the second state of charge.

8. The battery module of claim 1, wherein the electronic isolation system disconnects the battery pack and the first set of power contacts when the difference between the first parameter and the second parameter is not within the acceptable range of difference.

9. The battery module of claim 1, wherein the battery module comprises a first battery module of a plurality of battery modules of a battery module system, the battery module system comprising:
   a top detection device operable to detect another battery module of the plurality of battery modules positioned on a top of the first battery module; and a bottom detection device that is operable to detect another battery module of the plurality of battery modules positioned on a bottom of the first battery module.

\* \* \* \* \*